Oct. 25, 1932.  E. P. POLUSHKIN  1,884,208
BEARING SURFACE
Filed Feb. 8, 1930   2 Sheets-Sheet 2

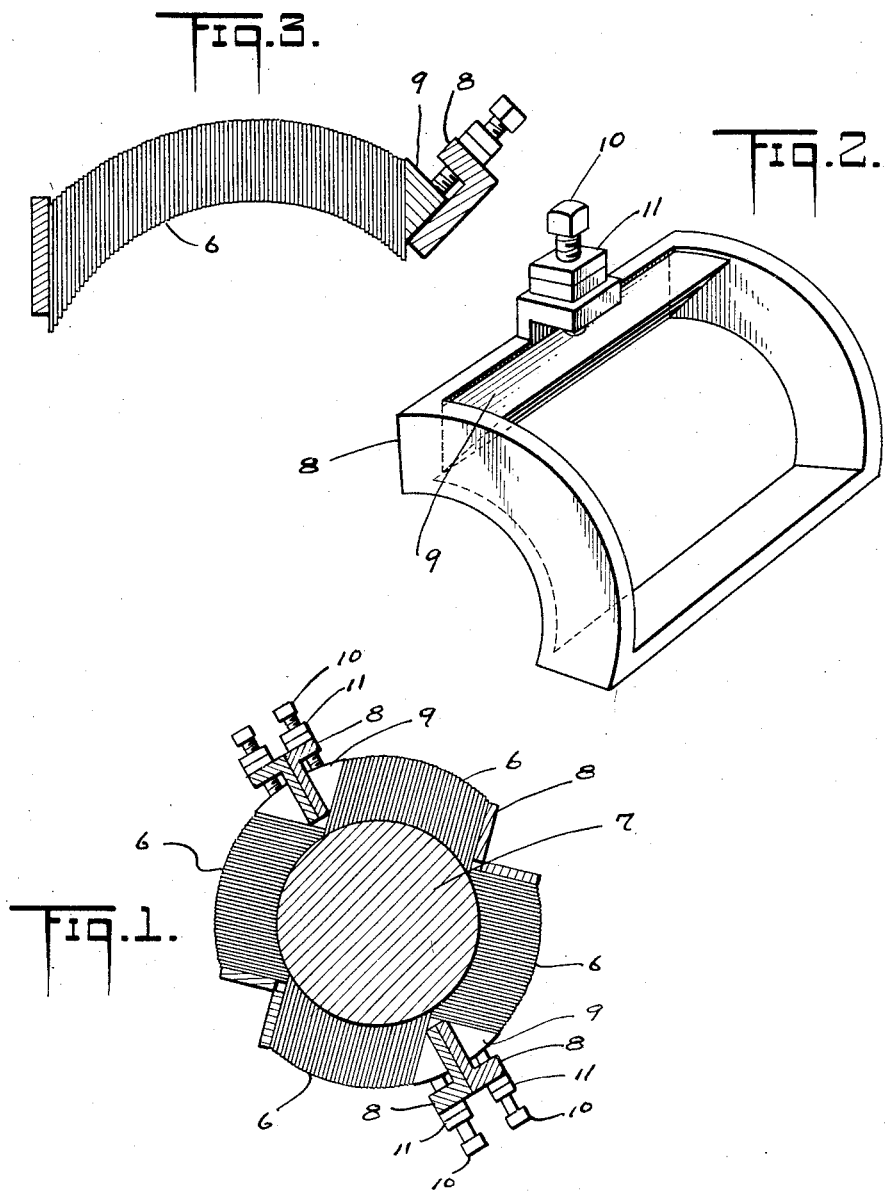

INVENTOR.
Eugene P. Polushkin
BY Duell, Dunn & Anderson
ATTORNEYS.

Patented Oct. 25, 1932

1,884,208

UNITED STATES PATENT OFFICE

EUGENE P. POLUSHKIN, OF NEW YORK, N. Y.

BEARING SURFACE

Application filed February 8, 1930. Serial No. 427,027.

This invention relates to bearing surfaces and processes for making the same.

An object of the invention is to produce improved bearing surfaces.

A more definite object of the invention is to produce bearing surfaces from fagoted wires.

According to this invention very thin wires of any suitable metal are cut into short pieces of equal length as, for example, one to one and three-quarter (1 to 1¾) inches long. The wires are straightened and polished and then placed parallel to each other in the fagot which is compressed within a rigid frame. Compressive force exerted by the frame holds all the wires together as a solid block of metal having two parallel surfaces, but when this force is slightly released the wires obtain a certain freedom of movement within the frame so that if outside pressure is applied to their ends, they may be easily pushed inward or outward. With the wires free to move, the frame is placed over the journal and the wires are closely pressed against the surface of the journal until they are in perfect contact with the surface. The wires are then rigidly compressed within the frame.

The invention will now be explained with reference to the drawings, of which:

Fig. 1 is a sectional view of a shaft with a bearing, according to the present invention, placed around it;

Fig. 2 is a projected view of one of the clamping frames for supporting one type of bearing surfaces according to this invention;

Fig. 3 is a sectional view showing one way of clamping bearing surfaces, according to this invention, together;

Figure 4:
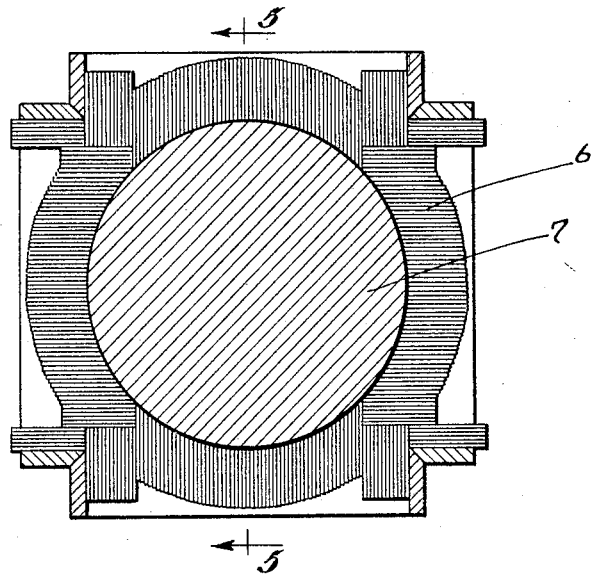
Fig. 4 is another sectional view of a bearing arranged on a journal.

Referring now to Fig. 1 of the drawings, the wires 6 are seen to be placed around and with their ends in close contact with the surface of the journal 7. The wires 6 are clamped tightly within the frame 8 by the pressure of the wedge 9, the positions of which are controlled by means of the adjusting screws 10. The locknuts 11 serve to prevent undesired movement of the adjustment screws 10. Figs. 2 and 3 show other views of the frame and clamping arrangements.

Figure 5:
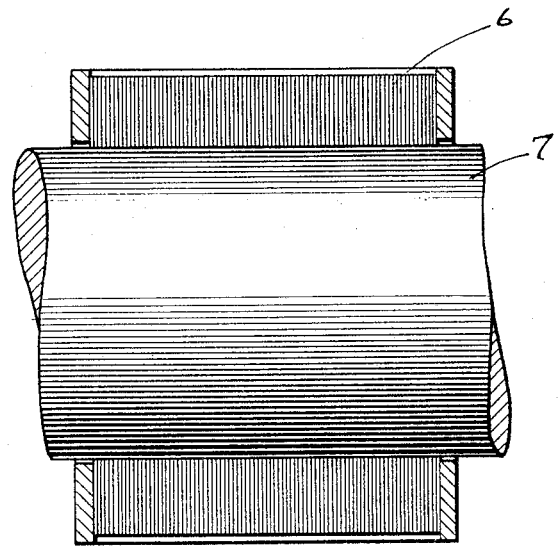
Fig. 5 is a view, partly in section, of the bearing shown in Fig. 4, taken on the line 5—5, Fig. 4.

Fig. 4 shows the wires 6 clamped around the journal 7 and supported in slightly different types of frames from those shown by Fig. 1. Fig. 5 illustrates how the ends of the wires 6 fit along the surface of the journal 7.

With one type of bearing surface according to this invention, the interstices between round wires may be left empty when the bearing surfaces are assembled and the empty channels filled with a lubricant. A liquid lubricant will pass through the channels to the bearing surface due to capillary action. When the lubricant has a heavy consistency or the capillary action is not sufficient, it can be pressed in by a force applied from the outside surface of the bearing. For example, the bearing may be entirely encased and the spaces between the wires filled with a heavy lubricant under hydraulic pressure. This pressure may be high enough not only to drive the lubricant through the channels but also to press the wires firmly against the journal surface. With bearing surfaces of this kind, a very uniform distribution of the lubricant will be obtained as each point on the bearing surface will be evenly lubricated. The wires can be made as strong as is desired for the conditions of service. For example, steel wires may be used. When the ends of the wires are worn down, the blocks can obviously be easily readjusted.

With another type of bearing surface, according to this invention, lead and other suitable bearing substances are placed between the wires during the manufacturing of the blocks. Liquid lead loaded if desired with tin or graphite is pressed in through the channels between the wires and when solidified forms a bond which holds the wires together as one solid block. This block can be made of a suitable shape to fit the journal surface or it can be machined into a desired shape. In either case the wires should be more or less perpendicular to the bearing surface. No frame is necessary in this case after the blocks have been manufactured and the wires do not need to be perfectly smooth. This process may be modified in the following manner: The wires are first coated with lead mixed if desirable with tin or graphite and then are placed into a fagot. The latter is compressed at a temperature sufficiently high for the lead to become liquid. Then, on cooling and solidifying the lead forms a permanent bond between the wires.

Lubrication in the bearing surfaces with fixed wires as described in the preceding paragraph is effected in the following manner: In actual service the soft material of the bond is soon worn out so that hollows are formed between the wires which serve to retain the lubricant on the bearing surface while the ends of the wires standing in relief support the load. Similar conditions exist in ordinary bearing metals which always contain hard crystals imbedded in the soft plastic matrix; when the latter is easily worn out and the crystals are left in relief to support the load. But in order to realize these conditions in ordinary bearing metals, it is necessary to depend upon the chemical affinity of the component metals so that the choice of the component metals is limited, whereas, according to this invention, any suitable metal may be selected as the bearing material.

Another type of bearing surface according to this invention may comprise wires of two kinds, one softer than the other, the hard and soft wires being arranged alternately. In service, the soft wires are soon worn out and the hollows left serve to retain the lubricant while the ends of the harder wires support the load. This modification may be used for bearings with adjustable wires such as the first type of bearing surface described in this specification, as well as those with fixed wires similar to the second type of bearing surface described herein.

The bearing surfaces above described can be employed not only for journals but for any sliding or other contacting parts of machinery where lubrication is necessary.

What is claimed is:

1. A bearing surface for a shaft composed of a plurality of straight parallel elongated metallic elements having axes perpendicular to the axis of said shaft and having interstices therebetween for the introduction of lubricant.

2. A bearing surface for a shaft comprising, in combination, a frame and a plurality of straight elongated metallic elements clamped in parallel relation within said frame with their axes perpendicular to the axis of said shaft.

3. A bearing surface for a shaft comprising, in combination, a frame and a plurality of straight parallel wires tightly clamped within said frame with their axes perpendicular to the axis of said shaft.

4. A bearing surface for a shaft comprising, in combination, a frame, a plurality of straight wires spaced within said frame, and means associated with said frame for tightly clamping said wires in parallel relation with their axes perpendicular to the axis of said shaft.

5. A bearing surface for a shaft, composed of a plurality of hard metal wires having axes perpendicular to the axis of the shaft and separated by soft metal.

6. A bearing surface for a shaft, composed of a plurality of hard metal wires having axes perpendicular to the axis of the shaft and having interstices therebetween and a soft metal in said interstices.

7. A bearing surface composed of a plurality of hard metal wires, and a plurality of soft metal wires.

8. A bearing surface composed of a plurality of alternately arranged hard metal wires and soft metal wires.

In testimony whereof I affix my signature.
EUGENE P. POLUSHKIN.